United States Patent [19]
Crespi et al.

[11] Patent Number: 5,458,997
[45] Date of Patent: Oct. 17, 1995

[54] REBALANCING OF LITHIUM/SILVER VANDIUM OXIDE (LI/SVO) CELLS FOR IMPROVED PERFORMANCE

[75] Inventors: Ann M. Crespi, Minneapolis; Paul M. Skarstad, Plymouth, both of Minn.

[73] Assignee: Medtronic, Inc., Minneapolis, Minn.

[21] Appl. No.: 293,354

[22] Filed: Aug. 19, 1994

[51] Int. Cl.$^6$ ............................................. H01M 10/38
[52] U.S. Cl. ............................................. 429/219; 429/60
[58] Field of Search ................................. 429/219, 60

[56] References Cited

U.S. PATENT DOCUMENTS

| | | | |
|---|---|---|---|
| 3,174,879 | 3/1965 | Stanimirovitch | 429/60 |
| 3,558,356 | 1/1971 | Jost | 429/60 |
| 4,091,178 | 5/1978 | Kordesch | 429/60 |
| 4,310,609 | 1/1982 | Liang et al. | 429/194 |
| 4,331,745 | 5/1982 | Catanzarite | 429/60 |
| 4,391,729 | 7/1983 | Liang. | |
| 4,399,202 | 8/1983 | Ikeda et al. | 429/91 |
| 4,598,029 | 7/1986 | Doddapaneni et al. | 429/50 |
| 4,830,940 | 5/1989 | Keister et al. | 429/219 |
| 4,964,877 | 10/1990 | Keister. | |
| 5,114,810 | 5/1992 | Frysz. | |
| 5,114,811 | 5/1992 | Ebel. | |
| 5,147,737 | 9/1992 | Post. | |
| 5,154,992 | 10/1992 | Berberick et al. | 429/197 |
| 5,221,453 | 6/1993 | Crespi. | |
| 5,250,373 | 10/1993 | Muffoleto. | |
| 5,298,349 | 3/1994 | Takeuchi. | |
| 5,312,458 | 5/1994 | Muffoleto. | |

OTHER PUBLICATIONS

Takeuchi and Thiebolt, "Stepwise Reduction of Silver Vanadium Oxide in Lithium/Silver Vanadium Oxide Cells" in *Primary and Secondary Ambient Temperature Lithium Batteries*, edited by Gabano, Takehara and Bro, Electrochemical Society, pp. 58–67, 1988.

*Primary Examiner*—Stephen Kalafut
*Assistant Examiner*—Carol Chaney
*Attorney, Agent, or Firm*—Daniel W. Latham; Harold R. Patton

[57] ABSTRACT

An electrochemical cell using a lithium anode and a silver vanadium oxide cathode is provided in which the cell is anode limited. Preferably, only enough lithium and electrolyte are provided in an Li/SVO cell to allow it to discharge only to the start of the second voltage plateau of its discharge curve. This provides a cell with improved performance in implantable defibrillator applications.

7 Claims, 4 Drawing Sheets

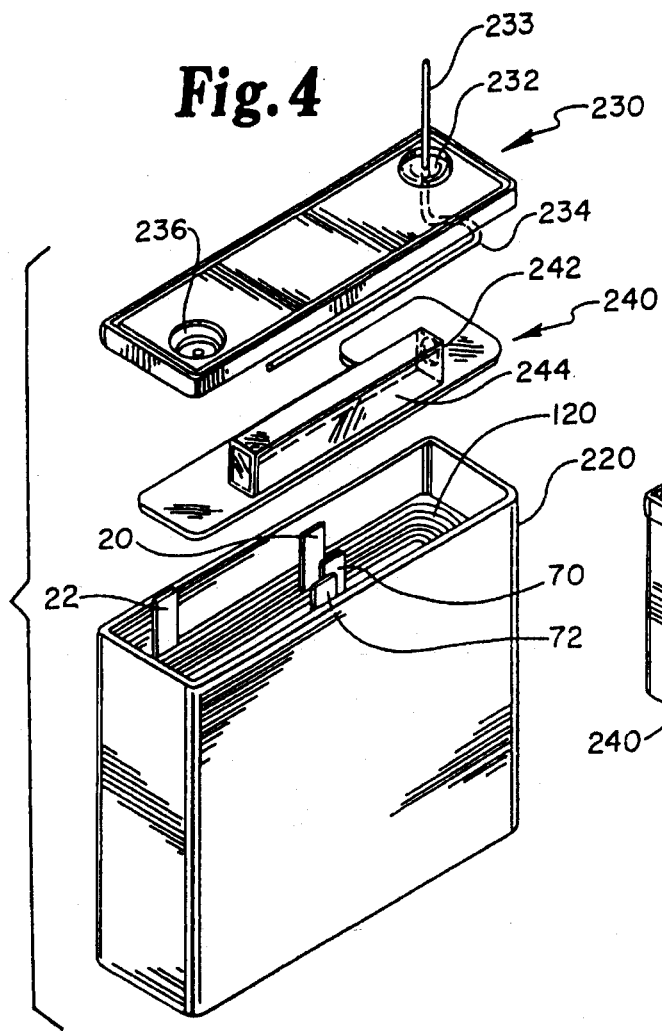
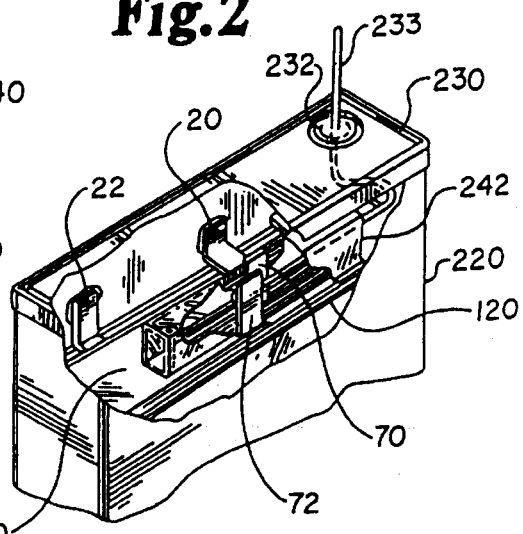
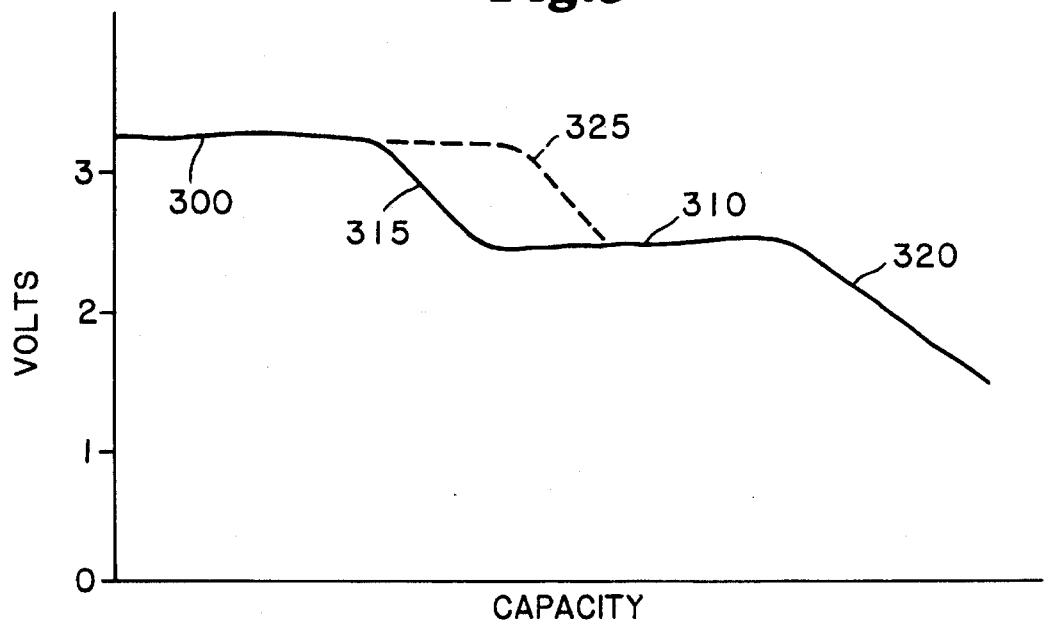

REBALANCING OF LITHIUM/SILVER VANDIUM OXIDE (LI/SVO) CELLS FOR IMPROVED PERFORMANCE

BACKGROUND OF THE INVENTION

This invention is broadly concerned with improving the performance of implantable cardiac defibrillators. These are products used for treatment of tachyarrhythmias, the irregular, rapid heartbeats that can be fatal if uncorrected. These devices produce a shock to the heart when called upon to correct an onset of tachyarrhythmia. The shock is delivered by a capacitor, which has been charged by the battery.

The electrical power source of choice at present for operating these electronic devices has been the Li/SVO battery or cell where SVO stands for silver vanadium oxide of the type disclosed in U.S. Pat. No. 4,310,609 or 4,391,729 issued to Liang et al or U.S. Pat. No. 5,221,453 issued to Crespi which are incorporated herein by reference in their entirety and used in batteries or cells as disclosed in U.S. Pat. Nos. 5,312,458; 5,298,349; 5,250,373; 5,147,737; 5,114,811; 5,114,810; 4,964,877; and 4,830,840. This particular cell chemistry has been useful for the defibrillator application because of its ability to produce pulses of energy which can charge the capacitors of the defibrillator in a timely manner. For example, once the implantable defibrillator has identified a tachyarrythmia the shock must be provided to the patient in a matter of a few seconds. Thus, the Li/SVO battery is typically called upon to charge the capacitors to deliver a shock of up to 40 joules within 10 seconds or less and to do so several times in succession if additional shocks are required. Unfortunately, on long-term discharge, these cells can develop high resistance that impairs their ability to charge the capacitors in a timely manner and therefore renders much of the capacity of the cell unavailable for long term use in an implantable defibrillator. Further, the end of service (EOS) determination in these cells is complicated by the variable nature of the resistance buildup.

This invention then is more specifically directed to improvements in Li/SVO cells to avoid this resistance buildup and render their operation more predictable as a basis for simple EOS determination.

SUMMARY OF THE INVENTION

The resistance of conventionally balanced cathode limited Li/SVO cells increases as a function of time after the cell is discharged to the second voltage plateau on its discharge curve. The present invention rebalances the cell constituents so that discharge occurs in the cell only through the first voltage plateau and first ramp to the start of the second voltage plateau and thus avoids the portion of the curve in which resistance buildup occurs. This rebalancing can be accomplished by reconfiguring the battery components to include less of the lithium and electrolyte material in the cell than would be used in a conventionally balanced cell. Contrary to what might be expected from the use of a lesser amount of reactive lithium in the cell than is needed to fully discharge the cathode, superior long term performance is obtained by this rebalancing since the same useful capacity can be provided in a defibrillator application as in a conventionally balanced cell but at a higher voltage toward the end of the discharge cycle so that the average capacitor charge time is lowered toward the end of the cell's useful life. Moreover, a more nearly constant resistance is obtained during discharge so that the EOS indication is made simpler and more predictable.

BRIEF DESCRIPTION OF THE FIGURES

FIG. 2 is a partial cut-away perspective view of a completed battery showing the connections of the tabs of the electrode with the case elements.

FIG. 4 is an exploded perspective view showing the application of the insulator and case top to the case and electrode assembly of FIG. 1.

FIG. 5 is a graph showing the discharge of a Li/SVO battery and as modified by the present invention.

DETAILED DESCRIPTION OF THE INVENTION

Batteries or cells are volumetrically constrained systems. The amounts of components that go into a battery (cathode, anode, separator, current collectors, electrolyte, etc.) can not exceed the available volume of the battery case. In addition, the appropriate amount of some components depends on the amount of other components that are used. These components must be "balanced" to provide discharge to the extent desired.

For example, in a cathode limited Li/SVO battery (all conventionally balanced Li/SVO batteries known to date are of this type) such as is used in a defibrillator application, the capacity ($Q_+$) of the cathode must not exceed the capacity ($Q_-$) of the anode. Cathode limited cells are also conventionally used in virtually all battery powered implantable medical devices such as heart pacemakers because of the proven reliability of their discharge over the long periods during which they are implanted. The volume occupied by the other battery components also depends on the cathode capacity ($Q_+$) as reflected by the amount of cathode material in the battery. The amount of electrolyte depends on the amount of cathode material and the amount of it to be discharged since the cathode material swells as the battery is discharged and requires more electrolyte to fill the additional cathode volume. The volume of the separator and current collector depends on the area of the electrodes. The area of the electrodes depends on the area required for consistent pulse output as the battery is discharged. All of these components must be adjusted for a given battery volume.

Although a variety of battery configurations and constructions are possible for Li/SVO batteries, a coiled or wrapped configuration will be discussed herein as an exemplar of a conventional Li/SVO battery for use with the invention. The invention is of course applicable to any configuration and construction.

Figure 1:
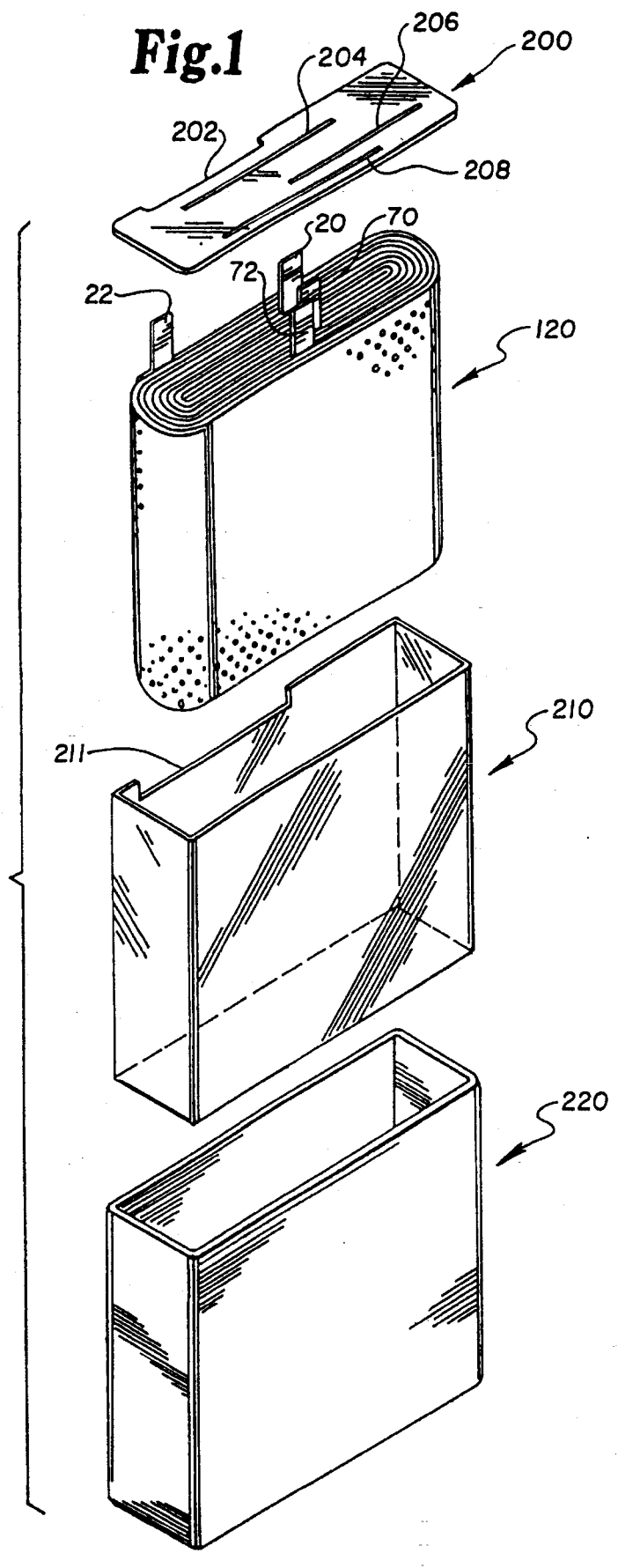
FIG. 1 is an exploded perspective view showing the insertion of an electrode assembly into a battery case together with insulator materials.

With reference to FIG. 1 such an exemplar battery construction is described. It can be seen that a coiled electrode assembly comprised of elongated anode and cathode sub-assemblies including anode material (Li) or cathode material (silver vanadium oxide—SVO which may also include PTFE binder, carbon black and graphite) pressed onto a metal current collector (Ni, Ti, etc.) and enveloped with a separator of microporous material such as polyethylene, polypropylene or the like are overlaid with respect to each other and coiled up. Connector tabs may be included within the electrode assembly for making electrical connection thereto.

Assembly of the electrode assembly 120 into a battery is shown in FIGS. 1–4. In FIG. 1, a coil insulator 200 is placed onto the electrode assembly 120. The coil insulator includes a notch 202 to accommodate anode connector tab 22 and slits 204, 206 208 to accommodate anode connector tab 20, and cathode connector tabs 70, 72 respectively. The electrode assembly 120 is also inserted into an insulative case liner 210. The case liner 210 preferably extends at its top edge above the edge of the electrode assembly 120 in order to provide an overlap with other insulative elements. If so, it may include a notch 211 on one side in order to allow the easy connection of the anode connector tabs 20, 22 to the case 220. The coil insulator 200 and case liner 210 are preferably made from a polyolefin polymer or a fluoropolymer such as PTFE or PCTFE. The electrode assembly 120 and case liner 210 are then inserted into a prismatic case 220, preferably made of stainless steel. In FIG. 4 a case cover 230 and a pin insulator 240 are shown along with the electrode assembly 120 and prismatic case 220. The case cover 230 has a glassed in feedthrough 232 and feedthrough pin 233 extending through an aperture in the case cover 230 that has a bend 234 which is intended to place the feedthrough 232 in alignment with the cathode connector tabs 70, 72. The case cover 230 also has a fill port 236. The case cover 230 is made from stainless steel and the feedthrough pin 233 is preferably niobium or molybdenum. The pin insulator 240 has an aperture 242 leading into a raised portion 244 which receives the feedthrough pin 233 and insulates the feedthrough pin 233 from contact with the case cover 230. In combination with one side of the coil insulator 200, which is immediately below the pin insulator 240, the raised portion forms a chamber which isolates the cathode connections. Additional insulation in the form of tubing or a coating (not shown) may also be included on the feedthrough pin 233 and feedthrough 232 at locations which will not be welded to further insulate the feedthrough pin 233 and feedthrough 232 and also an additional cover insulator (not shown) could be applied to the underside of the case cover 230 to provide additional insulation for the case cover 230. The feedthrough pin 233 is welded to the cathode connector tabs 70, 72 as shown in FIG. 2 and the anode connector tabs 20, 22 are bent into an "L" shape as shown in FIG. 2 and are welded to the side of the case 220 thereby making the metal case 220 one terminal or contact for the battery (i.e. a case negative design). The feedthrough pin 233 is then inserted through a split (not shown) in the pin insulator 240 until it projects through the aperture 242 of the pin insulator 240. The electrode assembly 120 may be out of the case 220 during some of the welding and bending operations. The case cover 230 is then welded to the case 220 to seal the electrode assembly 120 in the case.

Figure 3:
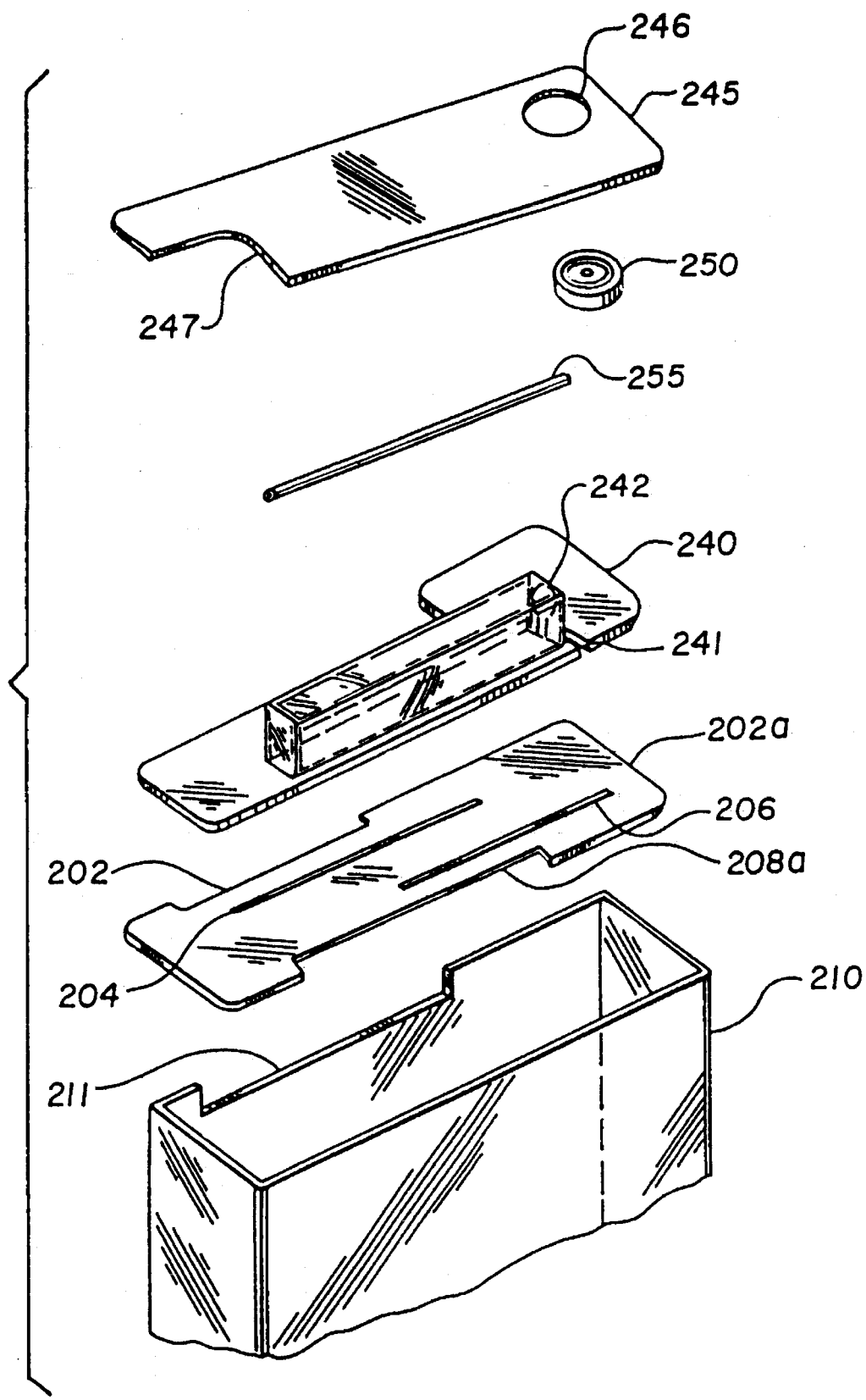
FIG. 3 is a partial cut-away perspective view of the isolation components for a battery.

Referring now also to FIG. 3, the isolation components for the battery are shown in greater detail. A cover insulator 245 is adapted to fit under the case cover 230 with an aperture 246 to accommodate the feedthrough 232 and feedthrough pin 233 and a cut-away portion 247 to accommodate the fill port 236. The cover insulator 245 is applied to the underside of the case cover 230. A feedthrough insulator 250 then slides over the feedthrough pin 233 and over the feedthrough 232 into contact with the cover insulator 245. Once the feedthrough insulator 250 is in place, a tubular insulator 255 is slipped over the feedthrough pin 233 until it contacts the feedthrough insulator 250. The feedthrough pin 233 is then bent into its desired configuration for connection with cathode connector tabs 70, 72 as shown in FIG. 4. The pin insulator 240 is shown with a split 241 which extends from the edge of the pin insulator 240 to the aperture 242. Again, the pin insulator 240 has an aperture 242 leading into a raised portion 244 or recess which receives the feedthrough pin 233 and the tubular insulator 255 over the feedthrough pin and insulates the feedthrough pin 233 from contact with the case cover 230 at the point where the feedthrough pin is welded to the cathode connector tabs 70, 72. The split 241 allows the pin insulator 240 to be placed on the feedthrough pin 233 after the feedthrough pin has been welded to the cathode tabs 70, 72. The tubular insulator 255 therefore extends through the aperture 242, thereby preventing any discontinuity in the isolation of the cathode connector tabs 70, 72 and feedthrough pin 233 from elements at anode potential. A coil insulator 202a is shown with a notch 202 to accommodate anode connector tab 22 and slits 204, 206 to accommodate anode connector tab 20, and cathode connector tab 70 respectively. A notch 208a is also provided to accommodate cathode connector tab 72 in place of the slit 208 shown in FIG. 1. The electrode assembly 120 is also inserted into an insulative case liner 210. All of the case isolation components including the cover insulator 245, the feedthrough insulator 250, the tubular insulator 255, the pin insulator 240, the coil insulator 202a and the case liner 210 are molded or extruded self-supporting polymeric parts preferably made from a polyolefin polymer or a fluoropolymer such as PTFE or PCTFE. The result of this insulator configuration is that the cathode connections are thoroughly isolated from the portions of the battery at anode potential and that the feedthrough connection is thoroughly isolated from stray particles of material from the cathode and from lithium particles that may form during discharge of the battery.

An appropriate electrolyte solution is introduced through the fill port 236 and the fill port 236 is then sealed. The electrolyte solution can be an alkali metal salt in an organic solvent such as a lithium salt (i.e., 1.0M $LiClO_4$ or $LiAsF_6$) in a 50/50 mixture of propylene carbonate and dimethoxyethane. The sealing process (not shown) may include, for example, making a first seal by pressing a plug into the aperture of the fill port 236 and making a second seal by welding a cap or disc over the fill port 236. Material utilized for leak checking hermetic seals may be included between the first and second seals.

From the above it is seen that there is provided, as an example of a battery which may make use of this invention, the battery including a solid cathode, liquid organic electrolyte and a lithium anode for delivering high current pulses. The battery further includes a casing containing the battery components and the cathode structure therein is wound in a plurality of turns, with the lithium anode interposed between the turns of the cathode winding. The casing also contains a non-aqueous liquid organic electrolyte comprising a combination of lithium salt and an organic solvent operatively contacting the anode and the cathode. An electrical connection is provided to the anode and an electrical connection is provided to the cathode. The cathode includes as active material silver vanadium oxide. Such cells find advantageous use as power sources for implantable cardiac defibrillators. This is an example of the type of battery with which this invention is particularly concerned.

As already indicated, such batteries in cathode limited design are generally known in the art and used to power defibrillators. As shown in FIG. 5, the open-circuit voltage of such Li/SVO cells have two voltage plateaus, a first voltage plateau 300 at about 3.2 v and a second voltage plateau 310 at about 2.6 v, with two sloping regions 315, 320. The cells of FIG. 5 are balanced with sufficient lithium and electrolyte to discharge the cathode to completion (i.e. conventionally balanced). With an SVO formula of $Ag_2V_4O_{11}$, it has been calculated that about 6.67 equivalents of Lithium are required to completely discharge one equivalent of SVO. This invention consists of rebalancing the cell such that it contains sufficient lithium and electrolyte to be discharged only to the point labeled above as "First Plateau Balanced". The volume made available by using less lithium and electrolyte allows more room for cathode material, extending the first plateau as shown by the dotted line 325.

Figure 6:
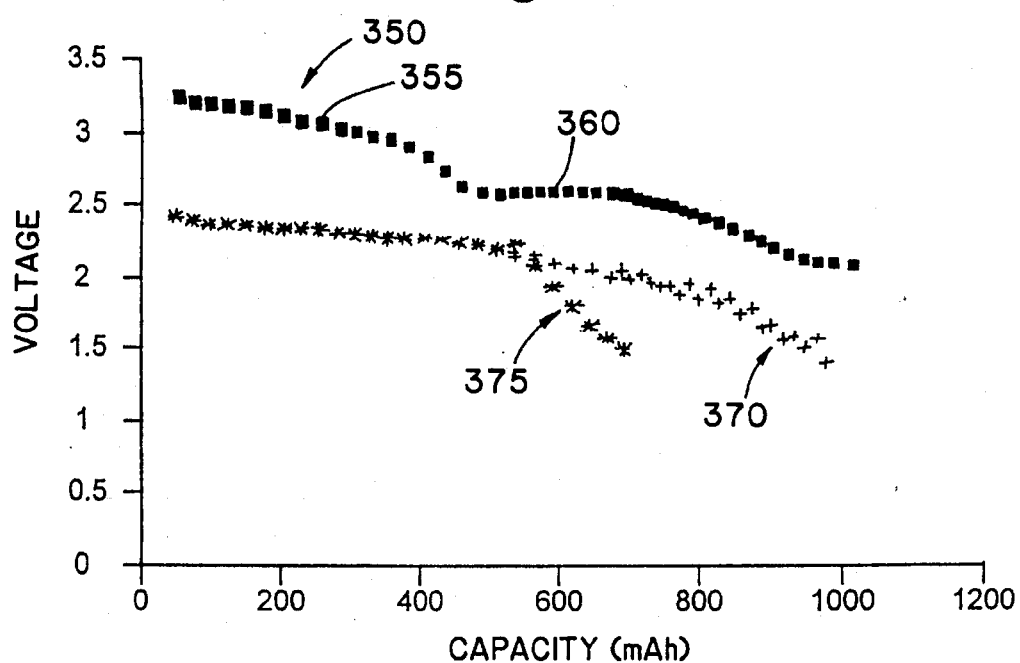
FIG. 6 is a graph showing a discharge curve for a conventionally balanced cathode limited Li/SVO battery.
Figure 7:
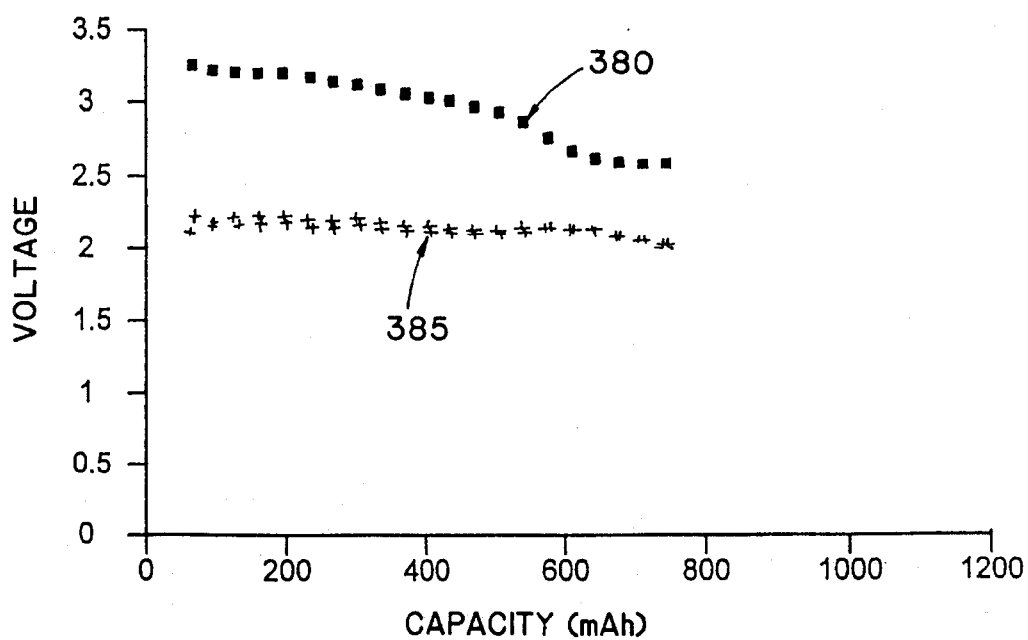
FIG. 7 is a graph showing a discharge curve for a rebalanced anode limited Li/SVO battery according to this invention.

Referring now to FIG. 6, expected discharge curves for the conventional type battery are shown for various application rate discharge tests. The open circuit voltage discharge curve 350 shows the characteristic first and second voltage plateaus 355,360. Pulse voltage is shown in curve 370 for a first discharge rate and in curve 375 for a slow discharge rate. Note that the curve for the second discharge rate diverges from the curve for the first discharge rate at the start of the second voltage plateau. The divergence in the curves 370, 375 indicates a rapid increase in resistance in the region of the second voltage plateau 360. This resistance increase is characteristic of some conventionally balanced lithium/silver vanadium oxide batteries and, when it occurs, it always becomes significant near the start of the second voltage plateau. Suppose one balances the battery, defining the start of the second voltage plateau as the end of discharge. To do this, one places less than the 6.67 equivalents of lithium per equivalent of SVO required to completely deplete the SVO cathode material into the cell— preferably using instead about 3 equivalents of lithium per equivalent of SVO. As set forth above, the reduced amount of lithium and electrolyte required by this battery composition allows one to improve performance by increasing the amount of SVO cathode material. It is also possible to further increase the capacity in the "rebalanced" battery by redesigning certain elements of the battery to allow the inclusion of yet more cathode material. In an implantable defibrillator, the defibrillator charges capacitors to a predetermined energy level when a defibrillation therapy is required. The amount of time required for charging is called the "charge time," which depends on the load voltage. The device no longer functions adequately when the pulse voltage reaches some minimum value. In the "rebalanced" battery of this invention, the pulse voltage stays substantially constant throughout discharge, so it can start at a lower value. Thus, the electrode area can be decreased. Decreasing the electrode area reduces the amount of volume occupied by separator and current collectors, so more volume is available for additional cathode material (see Tables and FIG. 7). The values of $Q_+$, $Q_-$, $V_{electrolyte}$, and $A_{electrode}$, and the volumes of other components obtained are shown in the Table 1. The discharge curve of FIG. 7 shows the background voltage curve 380 and the pulse discharge curve 385. The expected discharge curve 385 for such a battery is the same regardless of discharge rate, because discharge is avoided in the region where the resistance increase occurs.

TABLE 1

Volume Utilization of Conventional and Rebalanced Batteries

| | Conventional Balance - FIG. 6 | Rebalanced - FIG. 7 |
|---|---|---|
| Battery External Dimensions | | |
| Height | 2.54 cm | 2.54 cm |
| Width | 2.54 cm | 2.54 cm |
| Thickness | 0.90 cm | 0.90 cm |
| Cathode Capacity ($Q_+$) | 1085 mAh | 1676 mAh |
| Anode Capacity ($Q_-$) | 1592 mAh | 1020 mAh |
| Active Electrode Area ($A_{electrode}$) | 60.3 cm$^2$ | 42.8 cm$^2$ |
| Separator Volume ($V_{separator}$) | 0.58 cm$^3$ | 0.44 cm$^3$ |
| Current Collector Volume ($V_{current\ collectors}$) | 0.27 cm$^3$ | 0.19 cm$^3$ |
| Electrolyte($V_{electrolyte}$) | 2 cc | 1.5 cc |

Referring now to Table 2 below, conventional balance is compared to rebalanced according to the present invention.

TABLE 2

| | CONVENTIONAL BALANCE | REBALANCED |
|---|---|---|
| $\dfrac{Q_{-\ (anode)}}{Q_{+\ (cathode)}}$ | $Q_-/Q_+ > 1$ | $0.45 < Q_-/Q_+ < 0.7$ |
| $\dfrac{V_{electrolyte}}{Q_{+\ (cathode)}}$ | $>1.2$ cm$^3$/Ah | $<1$ cm$^3$/Ah |

Note:
$Q_+$ is based on conventional use of 6.67 eq. Li/SVO to deplete cathode - not deliverable capacity but calculated based on amount of cathode included initially in the battery.

The above Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

What is claimed is as follows:

1. A Li/SVO battery comprised of an anode, a cathode, and an electrolyte in relative amounts wherein the battery is anode limited such that the battery discharge is substantially completed as the open circuit battery voltage drops to about 2.6 volts.

2. A Li/SVO battery having a $$\frac{Q_{-(anode)}}{Q_{+(cathode)}}$$

of about 0.45–0.70; and a $$\frac{V_{electrolyte}}{Q_{+(cathode)}}$$

of about <1 cm$^3$/Ah

3. The Li/SVO battery of claim 1 wherein the quantity of the electrolyte is provided only in the amount needed for the electrochemical reaction involving the cathode.

4. In an implantable cardiac defibrillator, said defibrillator including a capacitor capable of providing an intense shock for terminating a tachyrhythmia in a patient and a battery which charges the capacitor upon detection of the tachyrhythmia by providing a pulse of energy to the capacitor, the improvement which comprises: an anode limited Li/SVO battery charging the capacitor.

5. A cardiac defibrillator according to claim 4 wherein the Li/SVO battery is comprised of components in predetermined relative limited amounts whereby discharge is substantially completed as the open circuit battery voltage drops to about 2.6 volts.

6. A cardiac defibrillator according to claim 4 wherein the Li/SVO battery has a $$\frac{Q_{-(anode)}}{Q_{+(cathode)}}$$

of about 0.45–0.70; and a $$\frac{V_{electrolyte}}{Q_{+(cathode)}}$$

of about $<1$ cm$^3$/Ah.

7. A cardiac defibrillator according to claim 4 wherein the Li/SVO battery is limited in electrolyte so as to provide only the electrolyte amount needed for the electrochemical reaction involving the cathode.

\* \* \* \* \*